United States Patent [19]

Stanley

[11] 3,862,362
[45] Jan. 21, 1975

[54] DISPLAY APPARATUS
[75] Inventor: Charles Vincent Stanley, Granada Hills, Calif.
[73] Assignee: International Telephone and Telegraph Corporation, New York, N.Y.
[22] Filed: Dec. 24, 1970
[21] Appl. No.: 101,301

[52] U.S. Cl............ 178/7.3 D, 178/6.8, 178/7.5 D, 178/7.7
[51] Int. Cl. ............................................. H04n 3/16
[58] Field of Search............... 178/6.8, 7.3 D, 7.5 D, 178/7.7, DIG. 20

[56] References Cited
UNITED STATES PATENTS
3,437,747   4/1969   Sheldon ............................ 178/6.8
3,546,375   12/1970  Vitt, Jr................................. 178/6.8
3,560,642   2/1971   Schroader et al............ 178/DIG. 20

Primary Examiner—Maynard R. Wilbur
Assistant Examiner—S. C. Buczinski
Attorney, Agent, or Firm—John T. O'Halloran; Menotti J. Lombardi, Jr.; Edward Goldberg

[57] ABSTRACT

A tube for producing a display on a phosphor screen of a field of view scanned by a mirror having means to image an elemental strip of the field of view on a plurality of radiant energy sensitive detectors arranged in a straight line perpendicular to the direction of scan. The length dimension of the strip is maintained parallel to the line of the detectors. The tube has a photo-cathode which is illuminated by a plurality of intensity modulated sources of light corresponding to the detectors. The electron stream output of the photo-cathode is confined magnetically and swept magnetically in synchronism with mirror movement. The tube is much simpler and less expensive than present day computerized displays.

6 Claims, 7 Drawing Figures

PATENTED JAN 21 1975

3,862,362

INVENTOR.
CHARLES V. STANLEY
BY
ATTORNEY

DISPLAY APPARATUS

BACKGROUND OF THE INVENTION

This invention relates to the art of converting electrical signals into optical images, and more particularly, to a device for providing a display of a field of view which has been optically scanned.

The invention will be found useful in many applications in addition to those disclosed herein and should, therefore, not be so limited. However, the invention has been found to be especially useful in displaying information obtained by prior art apparatus employing an airborne mirror system which scans the earth and reflects a moving elemental strip of the field of view onto a plurality of infrared cells or detectors arranged in a fixed position in a straight line perpendicular to the direction of scan.

In the past, the electrical outputs of the detectors have been converted by a computer into an image or picture of the field of view. For good resolution, as many as, or more than, 400 detectors are employed. A picture of even moderate size thus requires the computer to be large, complex, heavy and expensive. Normally, the display is also airborne. The large weight and expense of the computer thus are two of several serious disadvantages of the prior art system.

SUMMARY OF THE INVENTION

In accordance with the device of the present invention, the above-described and other disadvantages of the prior art are overcome by illuminating a phototube with a light source modulated in accordance with the output of a detector. The electron beam output of the phototube photocathode is then swept synchronously with the mirror assembly across a luminescent screen.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
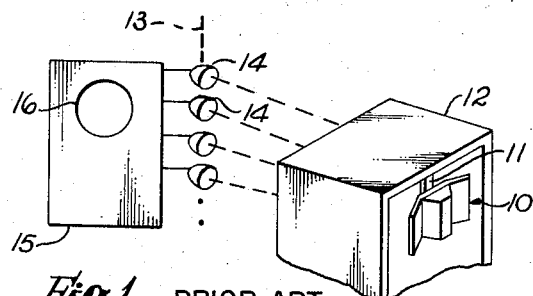
FIG. 1 is a perspective view of a prior art optical scanning and display system.

In the prior art, as shown in FIG. 1, a conventional mirror system 10 rotatable with a shaft 11 scans a predetermined area on the ground. Mirror system 10 and shaft 11 are mounted in a cabinet 12. All of the structure illustrated in FIG. 1 may be airborne. Mirror system 10 passes a vertical slice of the field of view in substantially a vertical plane through the axis 13 of a row of infrared detectors or cells 14.

The output of one particular cell 14 thus represents the intensity of a line in the field of view. However, first one of the cells 14 can have an output directly proportional to only one intensity at a time, the intensity of the different spots along the line is made a function of the angular position of mirror 10.

To obtain a fair sized picture, sometimes as many as 400 detectors 14 are employed. The outputs of the detectors 14 are then impressed upon a computer 15 which provides a visual display on the luminescent screen 16 of a cathode ray tube.

Due to the fact that a vast number of the detectors 14 are mated, the computer 15 must be very large and expensive. The disadvantage of the expense is evident. However the disadvantage of its unusually large size and weight makes it particularly difficult to justify its use in aircraft.

Figure 2:
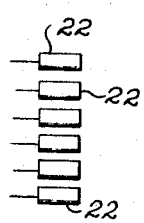
FIG. 2 is a longitudinal sectional view, partly in elevation, of one embodiment of the present invention.

The device of the present invention overcomes this problem. One embodiment of the invention is indicated in FIG. 2. In FIG. 2, two vacuum tubes 17 and 18 are employed and held in alignment by a non-magnetic sleeve 19 into which the tubes 17 and 18 are slidable to the positions shown in FIG. 2.

The left end of tube 18 terminates at a vertical line 20 in FIG. 2. The right end of tube 17 at 21 abuts the left end of tube 18.

A plurality of light sources 22 project beams of light through a lens 23. Lens 23 images the light outputs of sources 22 on a photocathode 24 fixed to the inside end surface of the evacuated envelope 25 of tube 17. Light sources 22 may be conventional incandescent lamps or light emitting diodes or otherwise.

The right end of envelope 25 is sealed by a fiber optics layer 26. The left end of envelope 27 of tube 18 is sealed by a fiber optics layer 28.

A phosphor screen 29 is coated onto the left-hand surface of layer 26. A photocathode 30 is coated onto the right-hand surface of layer 28. A phosphor screen 31 is coated onto the right-hand, inside end surface of envelope 27.

A coil 32 is provided around tube 17 to produce a magnetic field therethrough in a direction parallel to the longitudinal symmetrical axis of tube 17.

Coils are provided at 33 and 34 to produce a magnetic field in a direction of the toroidal axis of coils 33 and 34, which axis lies in the plane of the drawing approximately midway between the left and right ends of tube 17, and perpendicular to the axis of tube 17. As will be explained, the magnetic field produced by coils 33 and 34 varies with respect to time.

Tube 18 is an entirely conventional tube and is called an image converter magnification tube. Tube 18 takes the light output or the picture output of phosphor screen 29 through layer 26, and simply makes the picture larger when phosphor screen 31 is illuminated.

OPERATION

In the embodiment of FIG. 2, the light output of each source 22 is modulated in accordance with the output signal magnitude of one corresponding detector 14. Thus, as mirror system 10 scans, the light output of one corresponding source 22 will be modulated in time or in accordance with the angular position of mirror system 10 on shaft 11. Thus, in order to obtain a proper display, it would be necessary to move all of the sources 22. Moreover, some light storage means is necessary such as the phosphor screens 29 and 31. However, instead of moving the sources 22 themselves, a photocathode 24 produces a plurality of electron beams, one for each source 22. All of these beams are simultaneously moved in one direction by the magnetic field produced by coils 33 and 34. Coil 32 keeps the beams, more or less, collimated.

All of the electron beams are thus scanned across phosphor screen 29 and produce a picture at the output or right end of tube 17. The picture is then magnified by tube 18.

Figure 7:
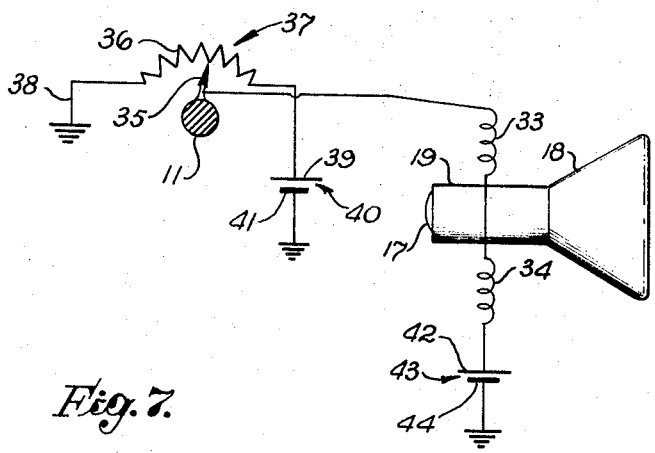
FIG. 7 is a diagramatic view of means for sweeping the electron output of a phototube.

As shown in FIG. 7, shaft 11 rotates a wiper 35 on the winding 36 of a potentiometer 37 in synchronism with the rotation of mirror system 10. One end of winding 36 is grounded at 38. The other end of winding 36 is connected to the positive pole 39 of a battery 40, the negative pole 41 of the battery 40 also being grounded.

Coils 33 and 34 are connected in series from wiper 35 to the positive pole 42 of a battery 43, battery 43 having a negative pole 44 which is grounded.

From the diagram of FIG. 7, it will be evident that the sweep of the plural electron beams inside tube 17 will be in synchronism with the rotation of mirror system 10. Mirror system 10 may oscillate back and forth. The same is true of the scan of the electron beams over phosphor screen 29. The sweep of an individual electron beam from photocathode 24 may be identical to the sweep of an electron beam in a conventional television picture tube using magnetic deflection; however, there is at least one difference in that there is no sweep employed which is perpendicular to the sweep inside tube 17 described previously.

Figure 4:
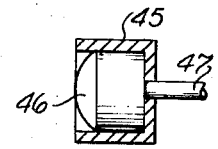
FIG. 4 is a sectional view, partly in elevation, of a portion of the means taken on the line 4—4 shown in FIG. 3.
Figure 3:
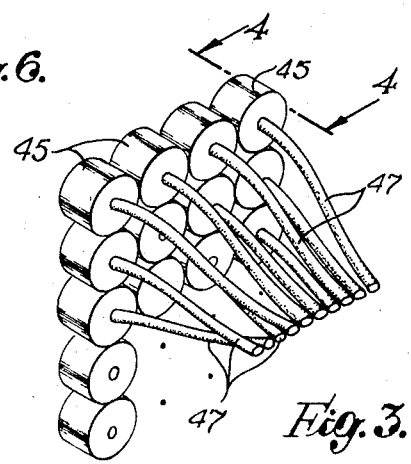
FIG. 3 is a perspective view of means for illuminating a phototube in accordance with another embodiment of the present invention.

In the event that the system of FIG. 2 becomes somewhat large because such a great number of light sources 22 are required, light may be supplied to tube 17 in a different way, as shown in FIGS. 3 and 4.

Figure 5:
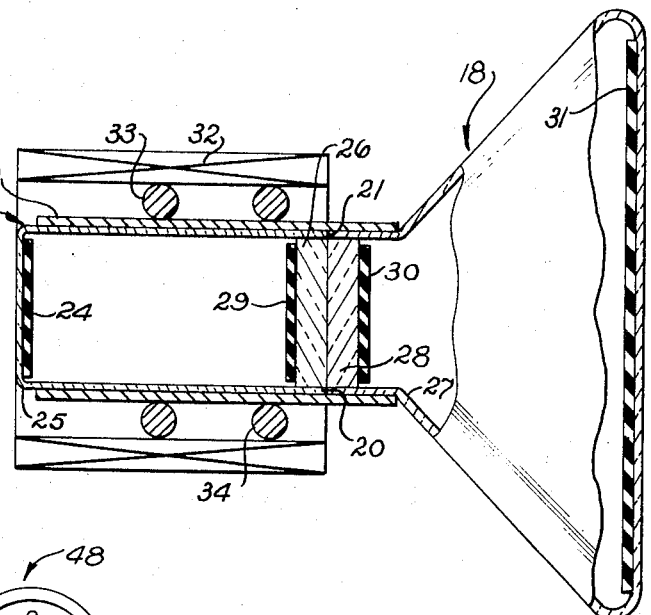
FIG. 5 is a broken away sectional view of an alternative vacuum tube construction of the present invention.
Figure 5:
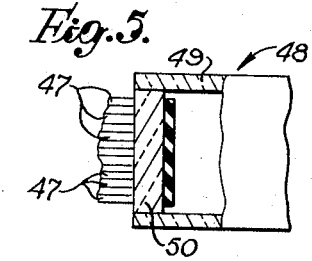
Figure 6:
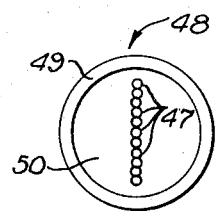
FIG. 6 is a rear end elevational view of a vacuum tube constructed in accordance with the present invention and illustrating the location of light inputs thereof.

Cells are employed at 45 to house light sources 46 of the same type as light sources 22. A fiber optics tube 47 then is connected from each shield 45 to a tube 48, shown in FIGS. 5 and 6, which may be identical to tube 17 except at its left end, as viewed in FIG. 2. Thus, the left end of tube 48 is shown in FIG. 5.

Tube 48 includes a glass evacuated envelope 49. The left end of envelope 49 is sealed with a fiber optics layer 50.

Note will be taken that cells 45 are located in rows and columns. However, a circular or any other configuration may be used.

As stated previously, as shown in FIG. 3, the ends of the fiber optics tube 47 are brought out in a line. The whole assembly of FIG. 3 is then turned 90° so that the line of the right ends of the tubes 47 are vertical. They are then fixed in position relative to tube layer 50 in FIGS. 5 and 6, as shown.

In accordance with the foregoing, it will be appreciated that the system of the present invention deals with the need for providing a display from a great number of detectors 14 with a minimum amount of equipment. Substantial improvement over the computerized system of the prior art is, therefore, achieved in that the system of the present invention is much less expensive. Further, the system of the present invention is small in size and light in weight. It, therefore, can be advantageously used in aircraft where the use of a prior art heavy and large computer system was a disadvantage.

Note will be taken that source 22 and the right ends of tubes 47, as viewed in FIG. 5, need not be in a straight line if detectors 14 are not in a straight line. The relative positions must be proportional, but not necessarily aligned.

Note will also be taken that only a few lines may be required. Moreover, for other purposes, only one source 22 may be required. The same is true of one source 46 including shield 45 and tube 47, shown in FIG. 4.

The light emitting diodes which may be used for sources 22 may be entirely conventional.

What is claimed is:

1. Display apparatus comprising: a first source of light; light scanning means for scanning light in a first direction; first means in the path of said light scanning means to modulate the intensity of the light output of said source in accordance with light received from said scanning means; a first electron tube including a transparent evacuated envelope having a longitudinal axis; a photocathode fixed relative to said envelope inside thereof at one end and providing an electron stream in accordance with said received light thereof; second means to direct the light output of said source onto said photocathode along a first line generally perpendicular to said axis and to said light scanning direction; third means to produce an axial first magnetic field through said first tube substantially perpendicular to the plane of said photocathode to keep said electron stream emanating therefrom located in substantially an axial orientation; a luminescent screen fixed relative to said envelope inside thereof at the other end thereof; and fourth means to deflect said electron stream in a direction parallel to said light scanning direction and perpendicular to said axis so that said stream will intercept said screen along a second line substantially parallel to said first line.

2. The invention as defined in claim 1, including a plurality of additional sources of light located in a straight line with said first source, said first means including a radiant energy detector for each source located in a straight line, an oscillatory assembly to mirror successive elemental strips of said energy within a field of view onto said detectors, said strips being parallel to the line of said detectors and being moved perpendicular thereto.

3. The invention as defined in claim 2, including a second tube fixed relative to said first tube to receive the light output thereof, said second tube being an image converter magnification tube.

4. The invention as defined in claim 3, wherein said second means includes a lens to image the light output ends of said sources on said one end of said first tube envelope.

5. The invention as defined in claim 3, wherein a set of light sources are positioned adjacent said first and additional sources, said one end of said first tube being closed by a fiber optics faceplate, said photocathode being coated on one side of said faceplate inside said first tube, and a fiber optics tube connected between each source and said faceplate, the ends of said fiber optics tubes being arranged in a manner different from the arrangement of said sources on said faceplate.

6. The invention as defined in claim 1, including a second tube fixed relative to said first tube to receive the light output thereof, said second tube being an image converter magnification tube.

* * * * *